UNITED STATES PATENT OFFICE.

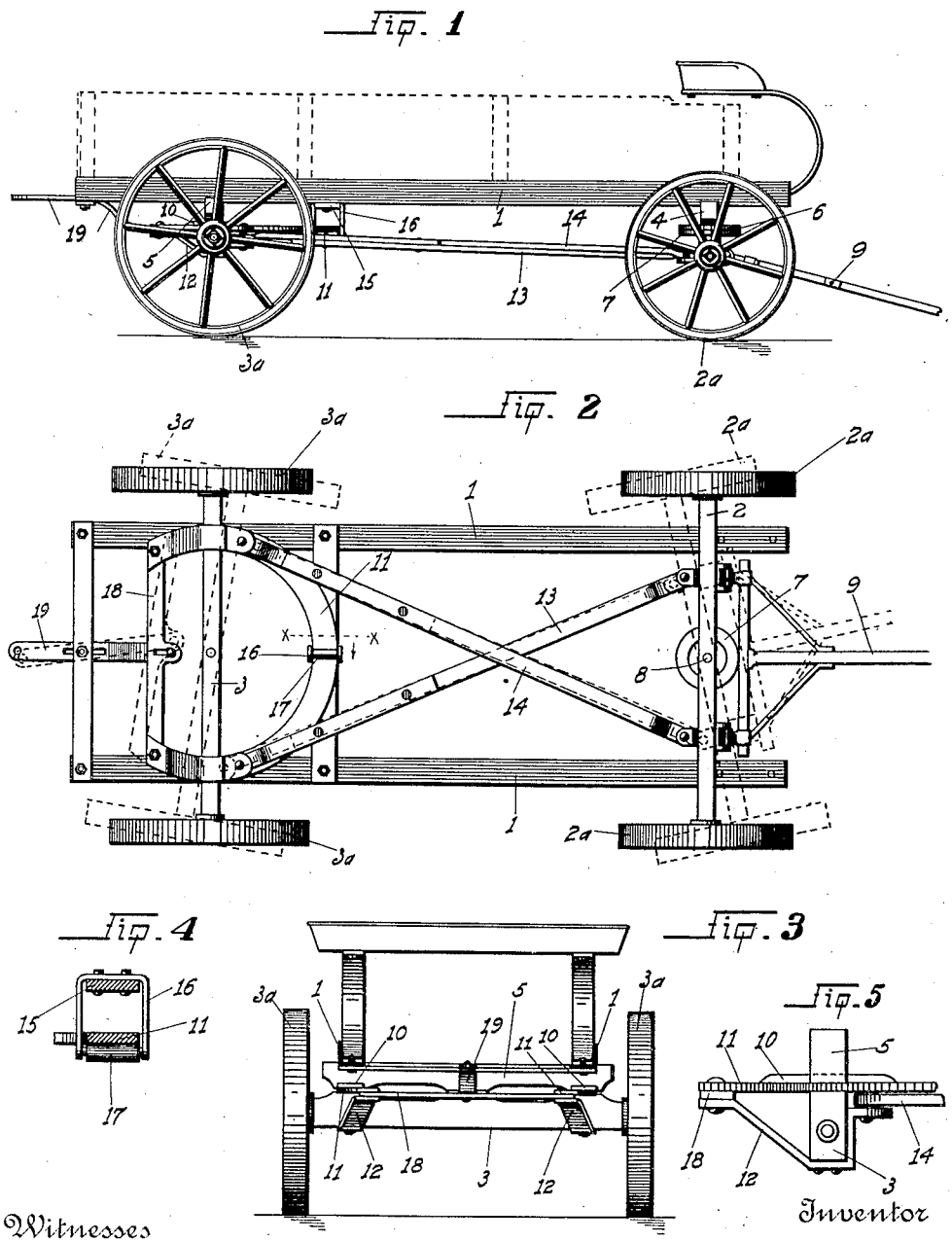

JAMES K. KENDRICK, OF GERMANTOWN, CALIFORNIA.

VEHICLE.

No. 904,703.   Specification of Letters Patent.   Patented Nov. 24, 1908.

Application filed February 5, 1908. Serial No. 414,331.

*To all whom it may concern:*

Be it known that I, JAMES K. KENDRICK, a citizen of the United States, residing at Germantown, in the county of Glenn and State of California, have invented certain new and useful Improvements in Vehicles; and I do declare the following to be a full, clear, and exact description of the same, such as will enable others skilled in the art to which it appertains to make and use the same, reference being had to the accompanying drawings, and to the characters of reference marked thereon, which form a part of this application.

This invention relates to improvements in vehicles of all classes, the object of the invention being to produce a vehicle in which the rear wheel trucks will turn continuously in a direction opposite to that in which the front wheels turn, thereby following the track made by the forward wheels, and thus making it easier to turn a wagon around corners and similar places; also a device whereby a string or train of wagons connected together will follow the same rule, each alternate wheel truck turning in a direction opposite to those in front, thus following in the track made by such front wheels; also to produce a simple and inexpensive device for the purpose. This object I accomplish by means of cross guide rods connecting the front and rear trucks of a wagon, each truck being freely turnable; also a means on the rear truck for connecting with the tongue of another wagon; also by such other and further construction and relative arrangement of parts, as will appear by a perusal of the following specification and claim.

In the drawings similar characters of reference indicate corresponding parts in the several views.

Figure 1 is a side elevation of my improved vehicle. Fig. 2 designates a bottom plan view of the vehicle. Fig. 3 is a rear elevation of the said vehicle. Fig. 4 is a fragmentary view of a roller bearing mechanism. Fig. 5 is a fragmentary view of a wheel truck.

Referring more particularly to the characters of reference on the drawings 1 designates the bed of the vehicle formed preferably of angle irons on which the box or body of the vehicle rests.

2 designates the front wheel truck beam and 3 the beam of the rear truck.

4 designates the front supporting bolster for the bed 1 while 5 designates the rear supporting bolster thereof, the same being secured to said members 1 forming an inflexible, solid frame member.

Secured to the beam 2 is a ring 6 and to the beam 4 a ring 7, said rings coacting as shown, the beams 2 and 4 being connected by means of a bolt 8. Secured to the beam 2 is the usual tongue 9. Secured to the bolster 5 are segment plates 10, while secured to the beam 3 is a segment ring 11 bearing against said plates 10.

12 are strap irons secured to the ends of the segment 11 and secured to the bottom of the member 3 and thence connected with the segment 11 on the other side of said member 3.

13 and 14 are guide rods secured to opposite ends of the member 2 and crossing each other, their other ends being secured intermediate the ends of the members 12 and the member 11, as shown. (Figs. 2 and 5).

15 is a cross member on the bottom of the member 1 depending from which is a hanger 16 carrying a roller 17, on which the member 11 bears.

18 is cross member on the ends of the member 11, while 19 is a guide member pivotally and slidably secured to the rear of the member 1 and to the member 18.

In practice when the truck beam 2 carrying the front wheels 2ª is turned the members 13 and 14, by reason of their being crossed, turn the segment 11 and incidentally truck beam 3 and wheels 3ª, in the opposite direction to the wheels 2ª, but in the same ratio, thereby causing said wheels 3ª to follow in the track of the wheels 2ª, thus turning corners with greater precision and without danger of running off the roadway.

The members 10 and 11 bearing together permit a freedom and ease of motion, while the roller 17 maintains the proper position of the member 11, thereby preventing it from sagging or being otherwise sprained by reason of the strain.

When two or more wagons are joined as in the case of mountain transportation or the like, the tongues of the rear wagons are joined to the members 19 in front of them, and thus when the rear wheels of one wagon turn in one direction the front wheels of the next wagon turn in the opposite direction in the same ratio, thus following in the track made by said front wagon. In this manner a string or train of wagons may be drawn and turn the shortest of corners with ease and precision.

From the foregoing description it will be seen that I have produced a vehicle having a guide mechanism which substantially fulfils all the objects of the invention as set forth herein.

While this specification sets forth in detail the present and preferred embodiment of my invention, still in practice such deviations from such detail may be resorted to as do not constitute a departure from the spirit of the invention.

Having thus described my invention, what I claim as new and useful and desire to secure by Letters Patent is:—

A wagon comprising the combination of a bed, a freely turnable front wheel truck thereon, a rear supporting bolster on said bed, a rear wheel truck, segmental plates secured to the under side of said rear bolster, a segmental ring disposed on the top of the beam of said rear truck and bearing on said segmental plates, and having its free ends projecting to the rear of the same, a cross member secured on said free ends, strap irons secured to said free ends and to the under sides of the beam of said rear truck and thence to said segmental ring, and guide rods secured intermediate said strap irons and said segmental ring and to alternate ends of said front wheel truck as set forth.

In testimony whereof I affix my signature in presence of two witnesses.

JAMES K. KENDRICK.

Witnesses:
 PERCY S. WEBSTER,
 FRANK H. CARTER.